(12) United States Patent
Oto

(10) Patent No.: US 8,410,749 B2
(45) Date of Patent: Apr. 2, 2013

(54) DEVICE AND METHOD FOR CONTROLLING THE CHARGING AND DISCHARGING OF A BATTERY FOR SUPPLYING POWER FROM THE BATTERY AND A FUEL CELL

(75) Inventor: Katsuya Oto, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 12/862,488

(22) Filed: Aug. 24, 2010

(65) Prior Publication Data

US 2011/0127943 A1     Jun. 2, 2011

(30) Foreign Application Priority Data

Nov. 30, 2009 (JP) ................................ 2009-272268

(51) Int. Cl.
*H02J 7/00* (2006.01)
*H01M 10/44* (2006.01)
*H01M 10/46* (2006.01)

(52) U.S. Cl. .......................... 320/101; 320/103; 320/126

(58) Field of Classification Search ................... 320/101
See application file for complete search history.

(56) References Cited

U.S. PATENT DOCUMENTS

| | | | |
|---|---|---|---|
| 5,780,980 A | 7/1998 | Naito | |
| 7,667,350 B2 | 2/2010 | Norimatsu et al. | |
| 7,723,948 B2 | 5/2010 | Minamiura et al. | |
| 2006/0063044 A1* | 3/2006 | DeVries | 429/9 |
| 2006/0068239 A1 | 3/2006 | Norimatsu et al. | |
| 2006/0068242 A1 | 3/2006 | Norimatsu et al. | |
| 2006/0087291 A1 | 4/2006 | Yamauchi | |
| 2007/0190369 A1* | 8/2007 | Leach et al. | 429/9 |
| 2008/0007200 A1 | 1/2008 | Minamiura et al. | |
| 2008/0106232 A1* | 5/2008 | Idzik et al. | 320/103 |
| 2009/0128087 A1 | 5/2009 | Ohmori | |
| 2009/0243390 A1 | 10/2009 | Oto | |

FOREIGN PATENT DOCUMENTS

| | | |
|---|---|---|
| JP | 08-289410 | 11/1996 |
| JP | 2003-274566 | 9/2003 |
| JP | 2006-128088 | 5/2006 |
| JP | 2006-129588 | 5/2006 |
| JP | 2006-166576 | 6/2006 |
| JP | 2008-10344 | 1/2008 |
| JP | 2008-166076 | 7/2008 |
| JP | 2009-124858 | 6/2009 |
| JP | 2009-232665 | 10/2009 |

OTHER PUBLICATIONS

Japanese Patent Application No. 2009-272268; Notice of Reasons for Rejection; Mailed Jan. 18, 2011 (English translation).
Japanese Patent Application No. 2009-272268; Notice of Reasons for Rejection; Mailed Oct. 10, 2010 (English translation).

* cited by examiner

*Primary Examiner* — Arun Williams
(74) *Attorney, Agent, or Firm* — Blakely, Sokoloff, Taylor & Zafman LLP

(57) ABSTRACT

According to one embodiment, a power supply device includes a fuel cell, a battery, a switch, and a controller. The fuel cell supplies electric power to an electronic device provided with a built-in battery. The battery is charged with electric power supplied from the fuel cell and supplies electric power to the electronic device. The switch switches the battery between charge mode and discharge mode. The controller controls the switch to switch the battery between the charge mode and the discharge mode. The controller calculates integrated discharge electric power and integrated discharge amount of the battery and, when the integrated discharge electric power reaches predetermined discharge electric power, switches the battery from the discharge mode to the charge mode. The controller calculates integrated charge amount of the battery and, when the integrated charge amount reaches the integrated discharge amount, switches the battery from the charge mode to the discharge mode.

14 Claims, 6 Drawing Sheets

DEVICE AND METHOD FOR CONTROLLING THE CHARGING AND DISCHARGING OF A BATTERY FOR SUPPLYING POWER FROM THE BATTERY AND A FUEL CELL

CROSS-REFERENCE TO RELATED APPLICATIONS

This application is based upon and claims the benefit of priority from Japanese Patent Application No. 2009-272268, filed Nov. 30, 2009, the entire contents of which are incorporated herein by reference.

FIELD

Embodiments described herein relate generally to a power supply device and a charge-discharge control method.

BACKGROUND

In recent years, fuel cells have attracted attention as power supply devices for mobile electronic devices such as personal computers (PCs) and personal digital assistants (PDAs). The fuel cell generates electric power using hydrocarbon-alcohol fuel. More specifically, the fuel cell generates electric power by an electrochemical reaction between hydrogen from alcohol and oxygen from the air. Accordingly, if an electronic device is provided with a fuel cartridge filled with alcohol fuel, electric power can be generated on-site regardless of the presence of an alternating current (AC) power supply.

Compared to secondary batteries such as lithium ion batteries, the fuel cell outputs less electric power per unit of volume. That is, to generate all electric power consumed by an electronic device, the fuel cell need to be large. In view of this, Japanese Patent Application Publication (KOKAI) No. 2009-124858 discloses a conventional technology related to a power supply device. According to the conventional technology, the power supply device monitors the use state of a mobile electronic device. According to the power consumption of the electronic device, the power supply device uses a fuel cell or a secondary battery to supply electric power to the electronic device.

With the conventional technology, the timing of switching between charge and discharge of the battery is not managed. Therefore, the battery is not switched from discharge mode to charge mode when its remaining charge allows it to be efficiently charged, resulting in inefficient charge/discharge cycles of the battery. Besides, since the remaining charge of the battery is not taken into account to switch between charge and discharge of the battery, the life of the battery may be reduced due to excessive charge and discharge.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a power supply device comprises a fuel cell, a battery, a switch, and a controller. The fuel cell is configured to supply electric power to an electronic device provided with a built-in battery. The battery is configured to be charged with electric power supplied from the fuel cell and supply electric power to the electronic device. The switch is configured to switch the battery between charge mode and discharge mode. The controller is configured to control the switch to switch the battery between the charge mode and the discharge mode. The controller is configured to calculate integrated discharge electric power and integrated discharge amount of the battery while the battery is being discharged and, when the integrated discharge electric power reaches predetermined discharge electric power, switch the battery from the discharge mode to the charge mode. The controller is configured to calculate integrated charge amount of the battery while the battery is being charged and, when the integrated charge amount reaches the integrated discharge amount, switch the battery from the charge mode to the discharge mode.

According to another embodiment, there is provided a charge-discharge control method applied to a power supply device comprising a fuel cell configured to supply electric power to an electronic device provided with a built-in battery, a battery configured to be charged with electric power supplied from the fuel cell and supply electric power to the electronic device, and a switch configured to switch the battery between charge mode and discharge mode. The charge-discharge control method comprises: a controller calculating integrated discharge electric power and integrated discharge amount of the battery while the battery is being discharged and, when the integrated discharge electric power reaches predetermined discharge electric power, controlling the switch to switch the battery from the discharge mode to the charge mode; and the controller calculating integrated charge amount of the battery while the battery is being charged and, when the integrated charge amount reaches the integrated discharge amount, controlling the switch to switch the battery from the charge mode to the discharge mode.

Figure 1:
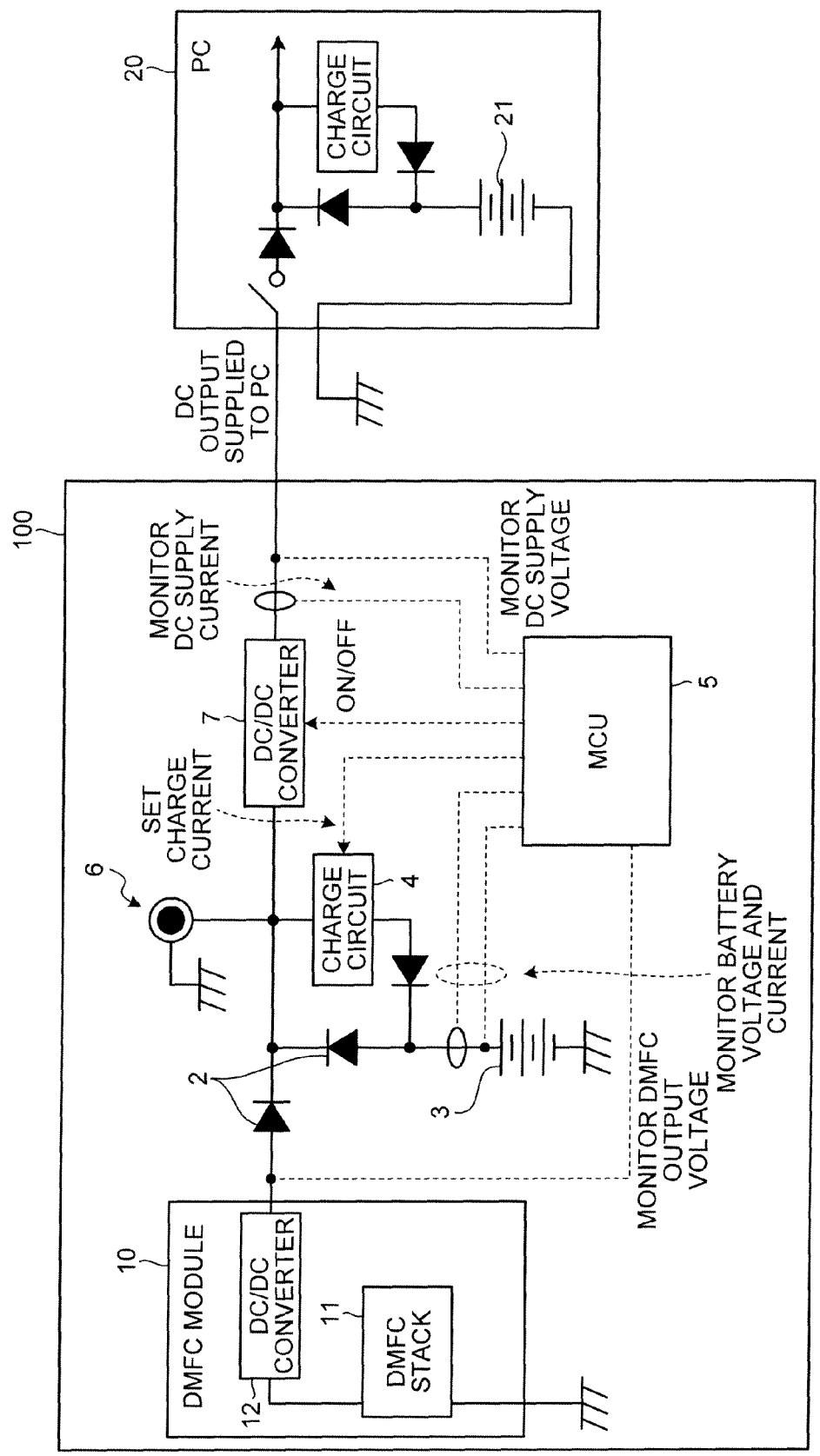
FIG. 1 is an exemplary block diagram of a power supply device according to an embodiment.

FIG. 1 is a block diagram of a power supply device 100 according to an embodiment. The power supply device 100 of the embodiment supplies electric power to a personal computer (PC) 20 as a mobile electronic device.

The PC 20 may be a common notebook PC. As illustrated in FIG. 1, the PC 20 comprises a built-in battery 21 and a DC-IN input terminal (not illustrated). The built-in battery 21 can be charged by an external power source through an AC adaptor, which is dedicated to the PC 20, connected to the DC-IN input terminal. Generally, the voltage input to the DC-IN input terminal of a notebook PC is monitored. When a voltage out of a predetermined voltage range is input, the input voltage is shut off and, for example, the PC 20 is controlled to enter operation mode where it is protected. That is, it is difficult to supply electric power to the PC 20 from both the DC-IN input terminal and the built-in battery 21 and, in general, the PC 20 is supplied with electric power from either one of the DC-IN input terminal or the built-in battery 21. Accordingly, when power supply voltage is input to the DC-IN input terminal of the PC 20, the PC 20 needs to be controlled not to be supplied with electric power also from the built-in battery 21. Further, the voltage input to the DC-IN input terminal is required to conform to the voltage specification of the PC 20.

Figure 7:
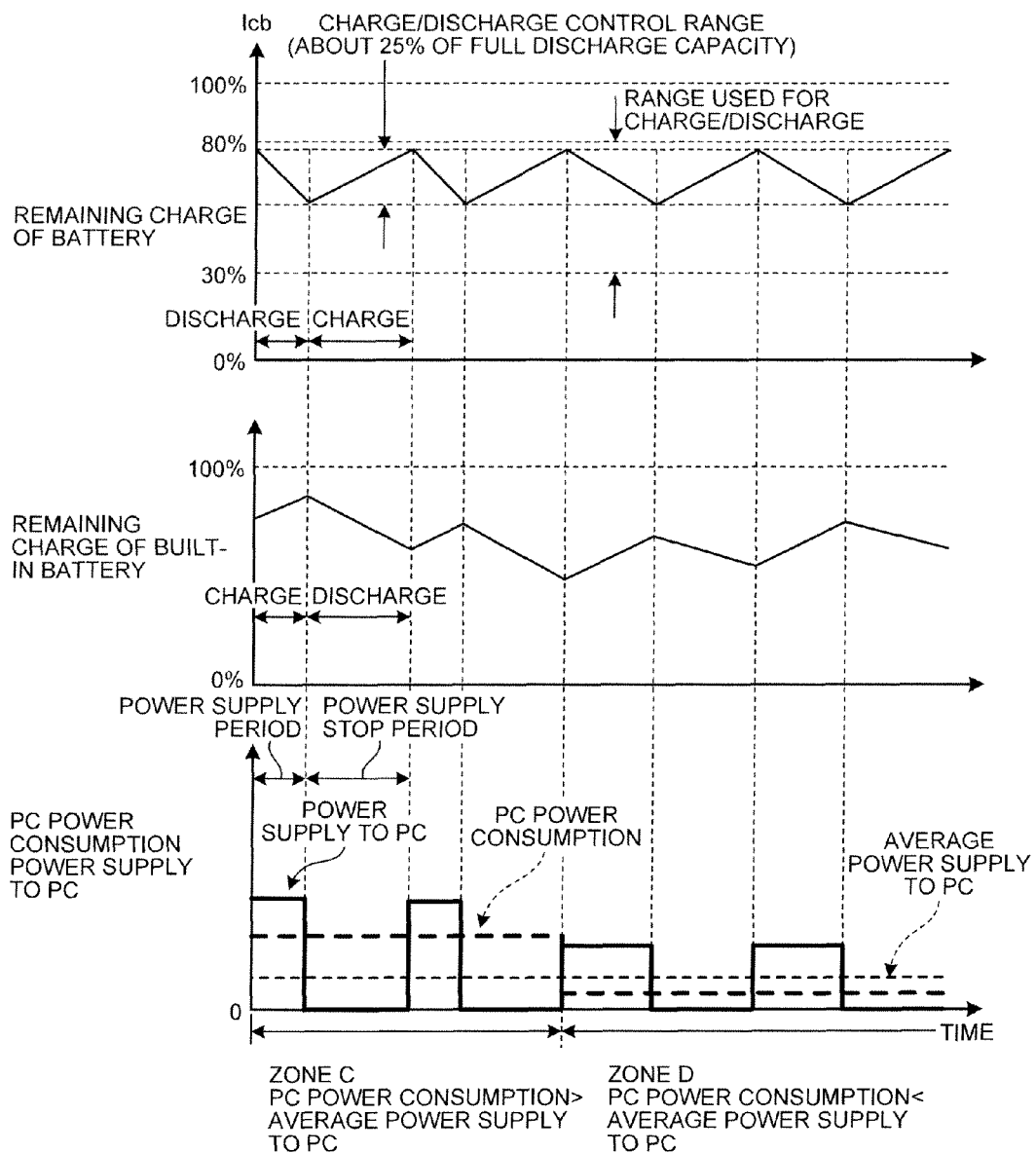
FIG. 7 is an exemplary chart for explaining changes in the remaining charge of the battery and a battery built in a personal computer (PC) in the embodiment.

For this reason, the power supply device 100 of the embodiment employs an intermittent power supply system in which a power supply period and a power supply stop period are alternately repeated (see FIG. 7). In the power supply period, the PC 20 is supplied with electric power from the DC-IN input terminal. On the other hand, in the power supply stop period, the PC 20 is supplied with electric power from the built-in battery 21. Thus, the PC 20 is prevented from being supplied with power from both the DC-IN input terminal and the built-in battery 21.

The power supply device 100 comprises a direct methanol fuel cell (DMFC) module 10. The DMFC module 10 comprises a DMFC stack 11 and a direct current-to-direct current (DC/DC) converter 12. The DMFC stack 11 includes a stack of DMFCs and generates electric power. The DMFC module 10 supplies the electric power generated by the DMFC stack 11 to the PC 20 through the DC/DC converter 12. The DC/DC converter 12 comprises a transformer circuit and the like, and controls the output of the DMFC module 10, i.e., at least one of output current and output voltage.

Figure 2:
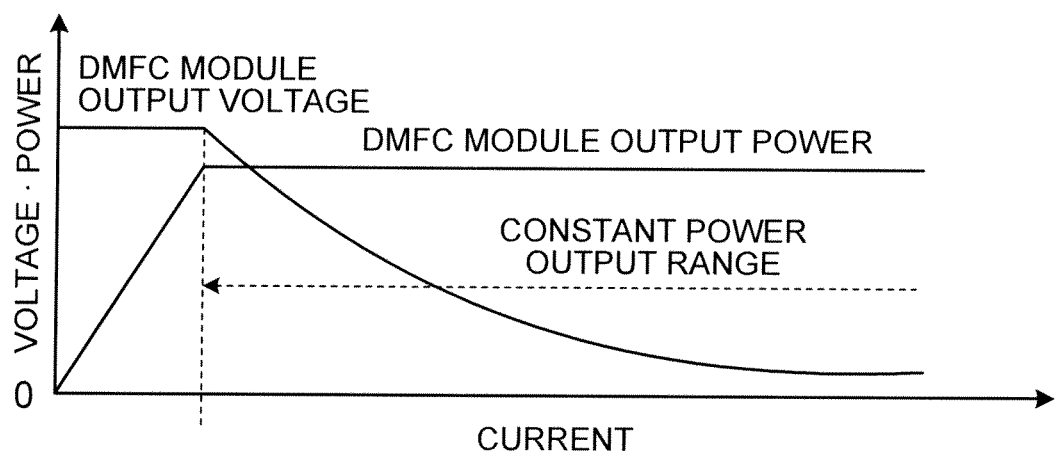
FIG. 2 is an exemplary chart of the current/voltage characteristics and the constant power output range of a direct methanol fuel cell (DMFC) module in the embodiment.

Because of its characteristics, it is desirable that the fuel cell be controlled to output constant power (constant power output control). FIG. 2 is a chart of the current/voltage characteristics and the constant power output range of the DMFC module 10. As indicated by the constant power output range illustrated in FIG. 2, the DMFC module 10 is controlled in such a manner that, when the current increases, the voltage is reduced to maintain the output voltage to be constant. Incidentally, when the output current becomes a predetermined value or less, the output voltage rises sharply. Accordingly, as illustrated in FIG. 2, when the output current becomes a predetermined value or less, constant power output control is performed based on the upper limit voltage provided for the output voltage.

As in the case of the PC 20, when electric power is supplied to a load the power consumption of which widely varies, it is difficult and ineffective to frequently control the output voltage and the output current of the DMFC module 10 as well as controlling power supply to the PC 20 to maintain electric power generation to be constant.

In view of this, as illustrated in FIG. 1, the power supply device 100 comprises a DMFC auxiliary battery 3, and provides hybrid power supply to the PC 20 from the battery 3 and the DMFC module 10. The battery 3 may be, for example, a secondary battery such as a lithium ion battery or a nickel-hydrogen battery. Using the battery 3 as an auxiliary battery of the DMFC module 10, the power supply device 100 can handle changes in the power consumption of the PC 20 while the output power of the DMFC module 10 is controlled to be constant.

A DC input terminal 6 is connected to a charge circuit 4. The DC input terminal 6 is used to charge the battery 3 by an external power source through a dedicated AC adaptor (not illustrated). With this, the battery 3 can be fully charged, which extends the time in which the PC 20 is active.

A diode 2 constitutes a diode OR circuit between the DMFC module 10 and the battery 3 to rectify the output current of the DMFC module 10. More specifically, the diode 2 connects the DMFC module 10 and the battery 3 to a DC/DC converter 7 while preventing current from flowing in the battery 3 from the DMFC module 10 and vice versa.

A system control microcomputer unit (MCU) 5 controls the entire system of the power supply device 100. The MCU 5 controls the battery 3 to switch between charge mode and discharge mode, and also controls hybrid power supply from the DMFC module 10 and the battery 3 to the PC 20. Further, the MCU 5 controls the DMFC module 10, a fuel tank, an auxiliary machine that adjusts the flow amount of fuel, voltage, etc., a pump, and the like to perform batch control related to the electric power generation of the DMFC stack 11.

The DC/DC converter 7 comprises a transformer circuit having a switching device. The DC/DC converter 7 turns on/off the switching device according to a control signal (ON/OFF signal) from the MCU 5 to supply or shut off electric power from the power supply device 100 to the PC 20.

The charge circuit 4 is connected between the diode 2 and the DC/DC converter 7. The charge circuit 4 charges the battery 3 with the output of the DMFC module 10. The charge circuit 4 switches the battery 3 between ON state where it is chargeable and OFF state where it is non-chargeable according to a control signal from the MCU 5.

More specifically, the MCU 5 monitors the output voltage and the output current of the battery 3 while the battery 3 is being charged (see FIG. 1) to calculate the integrated value of electric charge that the battery 3 is charged with (charge amount). When the charge amount becomes the integrated value of electric charge that the battery 3 discharges (discharge amount) calculated while the battery 3 is being discharged, the MCU 5 issues a control signal to turn off the charge circuit 4 so that the battery 3 starts discharging. The MCU 5 also issues a control signal to turn on the DC/DC converter 7 to provide hybrid power supply to the PC 20 from the battery 3 and the DMFC module 10.

The MCU 5 monitors the output voltage and the output current from the battery 3 while the battery 3 is being discharged (see FIG. 1) to calculate the integrated value of the discharge amount and the discharged electric power of the battery 3. When the integrated value of the discharge amount calculated while the battery 3 is being discharged becomes a predetermined value, the MCU 5 issues a control signal to turn off the DC/DC converter 7, thereby stopping hybrid power supply to the PC 20 from the battery 3 and the DMFC module 10. Further, the MCU 5 issued a control signal to turn on the charge circuit 4 so that the discharged battery 3 is to be charged. The predetermined value indicates about 25% of electric power (rated electric power of the battery 3) dischargeable from when the battery 3 is fully charged until the battery 3 stops discharging. The predetermined value is set in advance in the memory area of the MCU 5.

In this manner, the DC/DC converter 7 and the charge circuit 4 of the embodiment each function as a switch.

As previously described in connection with FIG. 2, the output voltage of the DMFC module 10 decreases as the output current increases. Accordingly, the MCU 5 monitors the output voltage of the DMFC module 10 while the battery 3 is being charged (see FIG. 1). When the output voltage of the DMFC module 10 drops due to the charging of the battery 3, the MCU 5 sets an auxiliary machine, a control signal, and the like to increase the output current so that the DMFC module 10 can output constant electric power. Besides, the MCU 5 sets the charge current of the charge circuit 4 to a value that allows the output voltage of the DMFC module 10 to be higher than the voltage of the battery 3 by 1 to 2 V and thereby controls the charge current.

On the other hand, the MCU 5 monitors the output voltage and the output current from the battery 3 (see FIG. 1) to control the charge/discharge of the battery 3 to be constant. Since charge/discharge electric power Pb of the battery 3 is controlled to be constant, the charge/discharge electric power Pb is represented by the following Equation 1:

$$Pb = Ib \times Vb = \text{constant} \qquad (1)$$

where Vb is the voltage of the battery 3, and Ib is the current of the battery 3.

Figure 3:
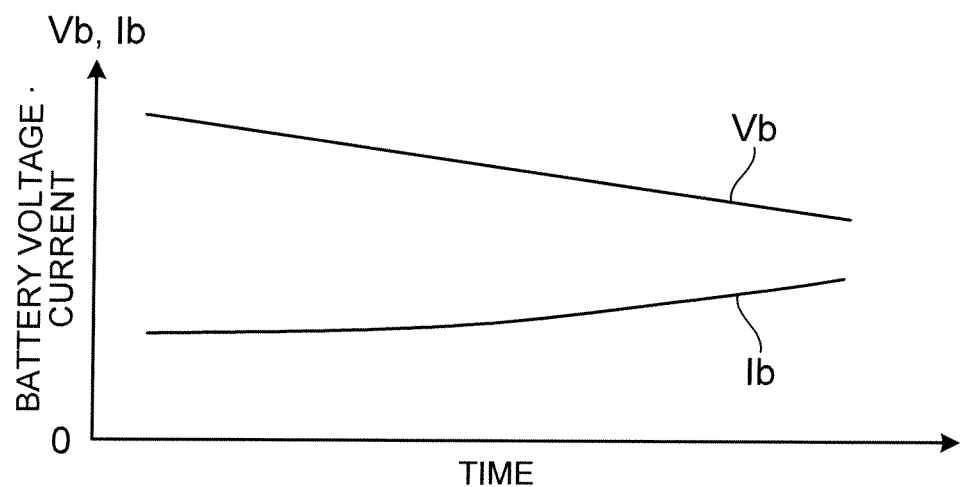
FIG. 3 is an exemplary chart of the voltage of a battery and a current at constant power charge/discharge control in the embodiment.

The voltage Vb and the current Ib of the battery 3 are as illustrated in FIG. 3. FIG. 3 is a chart of the voltage Vb of the battery 3 and the current Ib at the time of constant power charge/discharge control. As illustrated in FIG. 3, when the voltage Vb of the battery 3 drops, the MCU 5 controls the charge circuit 4 to increase the current Ib. With this, the discharge amount when the battery 3 discharges predetermined electric power increases as the voltage Vb decreases. As a result, the charge amount when the battery 3 is charged also increases.

While the battery 3 is being charged, the MCU 5 performs the constant power output control (see FIG. 2), electric power supplied from the DMFC module 10 to the battery 3 is constant. Accordingly, the lower the voltage Vb of the battery 3 is, the more the charge current Ib increases. Besides, since electric charge Icb [Ah]=current Ib [A]×time [h], as the remaining battery voltage Vb decreases, less time is taken to charge the battery 3 with predetermined electric charge Icb. In other words, if the voltage Vb of the battery 3 drops, the time required to charge the battery 3 does not substantially increase.

Figure 4:
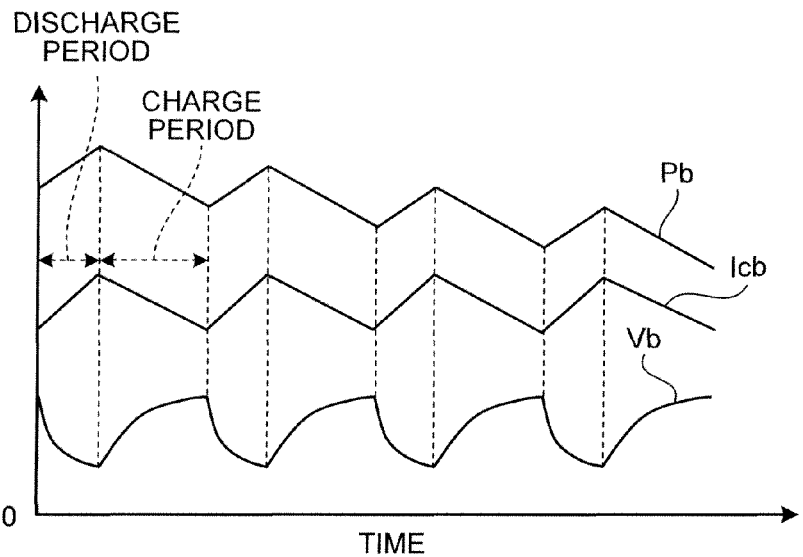
FIG. 4 is an exemplary chart for explaining changes in the charge/discharge electric power, charge/discharge amount, and voltage of the battery in the embodiment.

With reference to FIG. 4, a description will be given of changes in the charge/discharge electric power (charge electric power or discharge electric power) Pb, charge/discharge amount (charge amount or discharge amount) Icb, and voltage Vb of the battery 3 when the battery 3 is controlled to be switched between the charge mode and the discharge mode as described above. FIG. 4 is a chart for explaining changes in the charge/discharge electric power Pb, charge/discharge amount Icb, and voltage Vb of the battery 3.

As described above, the electric charge that the battery 3 is charged with is equal to that discharged from the battery 3. Therefore, in FIG. 4, the discharge amount Icb in the discharge period is equal to the charge amount Icb in the charge period. As the remaining charge of the battery 3 is maintained to be constant, the voltage Vb of the battery 3 changes in a predetermined range, i.e., between the voltage at the start of charge and the voltage at the start of discharge.

On the other hand, when the battery 3 is charged by the DMFC module 10, loss of charge electric power occurs. As a result, as illustrated in FIG. 4, the charge electric power Pb in the charge period is slightly larger than the discharge electric power Pb in the discharge period.

Figure 5:
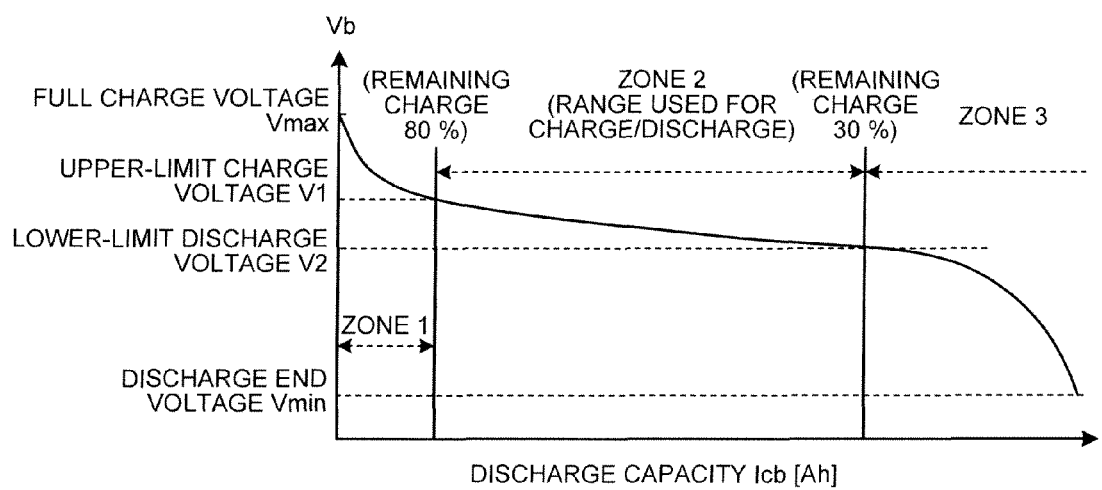
FIG. 5 is an exemplary chart for explaining a range used for the charge/discharge of the battery in the embodiment.

With reference to FIG. 5, a description will be given of charge/discharge control for the battery 3. FIG. 5 is a chart for explaining a range used for the charge/discharge of the battery 3. In FIG. 5, Vmax is the full charge voltage of the battery 3, Vmin is the discharge end voltage, V1 is the upper-limit charge voltage, and V2 is the lower-limit discharge voltage.

When a general lithium ion battery is charged to about 80 to 90% of full charge, thereafter, the charging speed rapidly decreases and the charging efficiency significantly reduces. In addition, excessive charge/discharge of a lithium battery causes the resolution of the battery electrolyte, which may result in a failure such as an internal short circuit. Therefore, as indicated by a zone 2 in FIG. 5, it is preferable that the charge/discharge of a lithium battery be controlled in a range between the upper-limit charge voltage V1 at which the battery voltage Vb rapidly increases and the lower-limit discharge voltage V2 at which the battery voltage Vb rapidly decreases.

In view of this, the MCU 5 of the embodiment forcibly terminates the charging of the battery 3 when the voltage Vb of the battery 3 reaches the upper-limit charge voltage V1 even if the battery 3 is yet to be charged by the discharge amount and causes the battery 3 to discharge.

Meanwhile, the MCU 5 forcibly terminates the discharging of the battery 3 when the voltage Vb of the battery 3 reaches the lower-limit discharge voltage V2 even if the battery 3 is yet to discharge the predetermined electric power and charges the battery 3.

As in this case, when the battery 3 is charged before discharging the predetermined electric power, the MCU 5 charges the battery 3 with electric charge set in advance in the memory area of the MCU 5 as 25% of the full discharge capacity (rated capacity) of the battery 3.

In the embodiment, according to experimental results, the upper-limit charge voltage V1 is set to a value at which the remaining charge (battery capacity) of the battery 3 is about 80%, while the lower-limit discharge voltage V2 is set to a value at which the remaining charge of the battery 3 is about 30%. The upper-limit charge voltage V1 and the lower-limit discharge voltage V2 vary depending on the type, structure, etc. of a secondary battery used as the battery 3, and are not determined by the ratio of remaining battery as described above. The upper-limit charge voltage V1 and the lower-limit discharge voltage V2 each may be set to a value determined based on the charge/discharge characteristics as described above.

Figure 6:
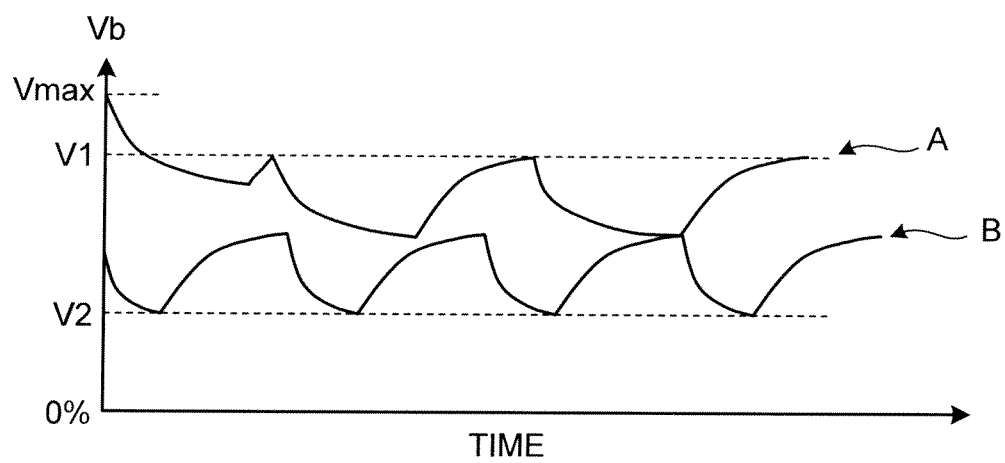
FIG. 6 is an exemplary chart for explaining changes in the voltage of the battery in the embodiment.

FIG. 6 is a chart for explaining changes in the voltage Vb of the battery 3 when the charge/discharge control is performed using the upper-limit charge voltage V1 and the lower-limit discharge voltage V2. FIG. 6 illustrates two different cases A and B depending on the size of the voltage at the start of discharge.

As indicated by A, when the battery voltage Vb at the start of discharge exceeds the upper-limit charge voltage V1 (in FIG. 6, the battery voltage Vb is the full charge voltage Vmax), the battery 3 continues discharging until the battery voltage Vb drops to the upper-limit charge voltage V1 or less and the predetermined electric power is discharged. Having discharged the predetermined electric power, the battery 3 is charged. Then, even if the battery 3 is not yet charged with integrated electric charge that the battery 3 has discharged, when the battery voltage Vb reaches the upper-limit charge voltage V1, the charging of the battery 3 is terminated, and the battery 3 starts discharging. After that, when the predetermined electric power is discharged again, the battery 3 is switched between the charge mode and the discharge mode at timing determined based on the upper-limit charge voltage V1 and the predetermined discharge electric power.

On the other hand, as indicated by B, when the battery voltage Vb at the start of discharge is less than the upper-limit charge voltage V1, or the battery voltage Vb drops to the upper-limit charge voltage V1 due to the repetition of charge/discharge, the discharging of the battery 3 is forcibly terminated, and the battery 3 is charged with electric charge set in advance as 25% of the full discharge capacity of the battery 3.

That is, the MCU 5 gives priority to the charge/discharge control based on the upper-limit charge voltage V1 and the lower-limit discharge voltage V2 (see FIG. 6) over that based on discharge electric power and electric charge integrated while the battery 3 is being discharged (see FIG. 4).

With this, in the power supply device 100 of the embodiment, the charge/discharge of the battery 3 can be repeated in a range of the zone 2 where the battery voltage Vb satisfies the relation: $V2 \leqq Vb \leqq V1$ (or $V2 < Vb < V1$). This achieves the efficient and secure charge/discharge cycle of the battery 3.

With reference to FIG. 7, a description will be given of changes in the remaining charge of the battery 3 and the built-in battery 21. FIG. 7 is a chart for explaining changes in the remaining charge of the battery 3 and the built-in battery 21.

As illustrated in FIG. 7, the power supply device 100 employs an intermittent power supply system in which a power supply period and a power supply stop period are alternately repeated. In the power supply period, the PC 20 is provided with hybrid power supply from the battery 3 and the DMFC module 10. On the other hand, in the power supply stop period, the PC 20 is not supplied with electric power. In the power supply period, the PC 20 is supplied with electric power from the battery 3 and the DMFC module 10. In the power supply stop period, the battery 3 is charged by the DMFC module 10.

Hereinafter, the average of electric power supplied from the power supply device 100 to the PC 20 during a period corresponding to a pair of one power supply period and one power supply stop period will be referred to as "average power supply" to the PC 20.

As in a zone C in FIG. 7, when the power consumption of the PC 20 exceeds the average power supply thereto, the built-in battery 21 discharges more electric power than is charged by the power supply device 100. Thus, the built-in battery 21 gradually runs out of charge as charge and discharge are repeated.

On the other hand, as in a zone D in FIG. 7, when the PC 20 consumes less power than the average power supply thereto, the built-in battery 21 discharges less electric power than is charged by the power supply device 100. Thus, the state of charge of the built-in battery 21 gradually increases as charge and discharge are repeated.

Besides, the charge/discharge of the battery 3 is controlled such that the discharge amount is equal to the charge amount. Thus, it is possible to prevent the battery 3 from excessive discharge and to maintain the remaining charge thereof within a predetermined range (in the zone 2).

Figure 8:
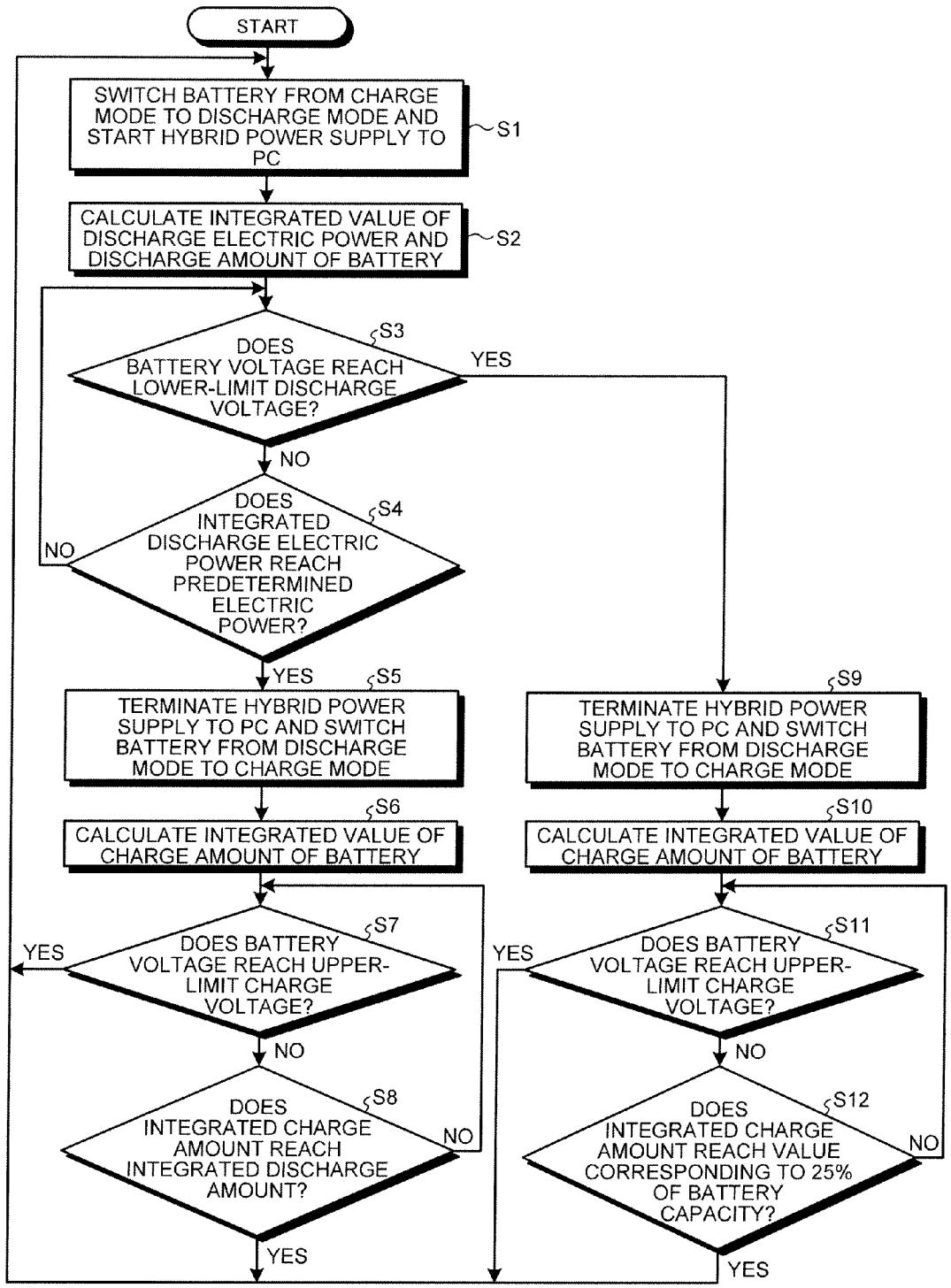
FIG. 8 is an exemplary flowchart of hybrid power supply and battery charge/discharge switching process performed by the DMFC module and the battery in the embodiment.

In the following, a description will be given of hybrid power supply to the PC 20 and battery charge/discharge switching process for the battery 3 performed by the power supply device 100 of the embodiment. FIG. 8 is a flowchart of battery charge/discharge switching process for the battery 3 and hybrid power supply performed by the DMFC module 10 and the battery 3.

First, the MCU 5 turns on the DC/DC converter 7 and turns off the charge circuit 4 to switch the battery 3 from charge mode to discharge mode, and the DMFC module 10 and the battery 3 start hybrid power supply to the PC 20 (S1). The MCU 5 starts calculating the integrated value of discharge electric power and electric charge (discharge amount) that the battery 3 discharges (S2).

The MCU 5 then determines whether the voltage Vb of the battery 3 reaches the lower-limit discharge voltage V2 (S3). If the voltage Vb of the battery 3 reaches the lower-limit discharge voltage V2 (Yes at S3), the process moves to S9. On the other hand, if the voltage Vb of the battery 3 does not reach the lower-limit discharge voltage V2 (No at S3), the MCU 5 determines whether integrated discharge electric power reaches predetermined electric power (S4). If the integrated discharge electric power reaches the predetermined electric power (Yes at S4), the process moves to S5. If not (No at S4), the process of S3 and S4 is repeated.

The MCU 5 turns off the DC/DC converter 7 to terminate hybrid power supply to the PC 20, and turns on the charge circuit 4 to switch the battery 3 from discharge mode to charge mode (S5). At the start of charging the battery 3, the MCU 5 starts calculating the integrated value of electric charge (charge amount) that the battery 3 is charged with (S6).

The MCU 5 then determines whether the voltage Vb of the battery 3 reaches the upper-limit charge voltage V1 (S7). If the voltage Vb of the battery 3 reaches the upper-limit charge voltage V1 (Yes at S7), the process returns to S1, and the MCU 5 switches the battery 3 from charge mode to discharge mode. On the other hand, if the voltage Vb of the battery 3 does not reach the upper-limit charge voltage V1 (No at S7), the MCU 5 determines whether the integrated charge amount reach the integrated discharge amount calculated while the battery 3 is being discharged (S8). If the integrated charge amount reaches the integrated discharge amount (Yes at S8), the process returns to S1, and the MCU 5 switches the battery 3 from charge mode to discharge mode. If not, the process of S7 and S8 is repeated.

If the voltage Vb of the battery 3 reaches the lower-limit discharge voltage V2 (Yes at S3), as described above, the MCU 5 switches the battery 3 from discharge mode to charge mode before the battery 3 discharges the predetermined electric power. Accordingly, as with S5 and S6, the battery 3 is charged (S9 and S10) and, as with S7, the MCU 5 determines whether the voltage Vb of the battery 3 reaches the upper-limit charge voltage V1 (S11). Differently from the process of S8 where charge electric power is set based on the integrated charge amount, the battery 3 is charged until the integrated charge amount reaches a value corresponding to 25% of the battery capacity (S12). If the integrated charge amount reaches the value corresponding to 25% of the battery capacity (Yes at S12), the process returns to S1, and the MCU 5 switches the battery 3 from charge mode to discharge mode. If not (No at S12), the process of S11 and S12 is repeated. The power supply device 100 repeats the process described above from when the PC 20 is turned on until the PC 20 is turned off to supply electric power to the PC 20.

As described above, according to the embodiment, the charge/discharge of the battery 3 is switched with a shallow discharge depth (low discharge) based on the discharge electric power, the discharge amount, the upper-limit charge voltage V1, and the lower-limit discharge voltage V2. This achieves the efficient charge/discharge cycle of the battery 3. Moreover, since the remaining charge of the battery 3 is monitored, the minimum remaining charge in the secondary battery can be ensured. Thus, it is possible to prevent the life of the battery from being reduced due to excessive charge and discharge.

Besides, the power supply device 100 switches the charging of the battery 3 to the discharging thereof, i.e., the charging of the built-in battery 21, at an early stage. Accordingly, the built-in battery 21 can be efficiently charged. Because of the efficient use of the built-in battery 21, hybrid power supply can be provided to a load the power consumption of which widely varies such as a PC from both the built-in battery 21 and the power supply device 100. Thus, the PC can be active for longer time even when not connected to an external power source.

The predetermined discharge electric power is described above as being about 25% of electric power dischargeable from when the battery 3 is fully charged until the battery 3 stops discharging. The predetermined discharge amount is described above as being a value corresponding to about 25% of the full discharge capacity of the battery 3. However, they are not so limited. The predetermined discharge electric power and the predetermined discharge amount vary depending on the type, structure, etc. of a secondary battery used as the battery 3, and each may be a value achieving efficient battery charge discharge cycle and longer battery life.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A power supply device connectable to an electronic device comprising a first battery, the power supply device comprising:
    a fuel cell; and
    a second battery, wherein
    the power supply device is configured to alternately switch a state between a first state in which the fuel cell and the second battery supply electric power to the electronic device as well as charge the first battery and a second state in which the fuel cell charges the second battery as well as the first battery supplies electric power to the electronic device,
    in the first state, integrated discharge electric power and integrated discharge amount of the second battery are calculated and, when the integrated discharge electric power reaches a predetermined amount, the state is switched to the second state, and
    in the second state, integrated charge amount of the second battery is calculated and, when the integrated charge amount reaches the integrated discharge amount, the state is switched to the first state.

2. The power supply device of claim 1, wherein the predetermined amount corresponds to a predetermined percentage of electric power dischargeable from the second battery that is fully charged.

3. The power supply device of claim 1, wherein, even when the integrated charge amount does not reach the integrated discharge amount, the state is switched from the second state to the first state when voltage of the second battery reaches upper-limit charge voltage lower than full charge voltage of the second battery.

4. The power supply device of claim 1, wherein, even when the integrated discharge electric power does not reach the predetermined amount, the state is switched from the first state to the second state when voltage of the second battery reaches lower-limit discharge voltage higher than discharge end voltage of the second battery.

5. The power supply device of claim 4, wherein, when the state is switched to the second state before discharging the predetermined amount, the second battery is charged to a predetermined percentage of capacity of the second battery.

6. The power supply device of claim 1, wherein output voltage of the second battery is monitored while the second battery is being charged and charge current of the second battery is controlled such that output voltage of the fuel cell is higher than voltage of the second battery.

7. The power supply device of claim 1, further comprising an input terminal through which electric power is supplied from an external power source to the second battery.

8. A charge-discharge control method applied to a power supply device connectable to an electronic device comprising a first battery, the power supply device comprising a fuel cell and a second battery, the charge-discharge control method comprising:
    alternately switching a state between a first state in which the fuel cell and the second battery supply electric power to the electronic device as well as charge the first battery and a second state in which the fuel cell charges the second battery as well as the first battery supplies electric power to the electronic device,
    in the first state, integrated discharge electric power and integrated discharge amount of the second battery are calculated and, when the integrated discharge electric power reaches a predetermined amount, the state is switched to the second state; and
    in the second state, integrated charge amount of the second battery is calculated and, when the integrated charge amount reaches the integrated discharge amount, the state is switched to the first state.

9. The charge-discharge control method of claim 8, wherein, even when the integrated charge amount does not reach the integrated discharge amount, the state is switched from the second state to the first state when voltage of the second battery reaches upper-limit charge voltage lower than full charge voltage of the second battery.

10. The charge-discharge control method of claim 8, wherein, even when the integrated discharge electric power does not reach the predetermined amount, the state is switched from the first state to the second state when voltage of the second battery reaches lower-limit discharge voltage higher than discharge end voltage of the second battery.

11. A system comprising:
    an electronic device comprising a first battery; and
    a power supply device comprising a fuel cell and a second battery, and connectable to the electronic device, wherein
    the power supply device is configured to alternately switch a state between a first state in which the fuel cell and the second battery supply electric power to the electronic device as well as charge the first battery and a second state in which the fuel cell charges the second battery as well as the first battery supplies electric power to the electronic device,
    in the first state, integrated discharge electric power and integrated discharge amount of the second battery are calculated and, when the integrated discharge electric power reaches a predetermined amount, the state is switched to the second state, and
    in the second state, integrated charge amount of the second battery is calculated and, when the integrated charge amount reaches the integrated discharge amount, the state is switched to the first state.

12. The power supply device of claim 1, wherein, in the first state, hybrid power supply is provided to the electronic device by the fuel cell and the second battery as the electric power.

13. The charge-discharge control method of claim 8, wherein, in the first state, hybrid power supply is provided to the electronic device by the fuel cell and the second battery as the electric power.

14. The system of claim 11, wherein, in the first state, hybrid power supply is provided to the electronic device by the fuel cell and the second battery as the electric power.

* * * * *